US008331669B2

(12) United States Patent
Artan et al.

(10) Patent No.: US 8,331,669 B2
(45) Date of Patent: *Dec. 11, 2012

(54) METHOD AND SYSTEM FOR INTERACTIVE SEGMENTATION USING TEXTURE AND INTENSITY CUES

(75) Inventors: Yusuf Artan, Chicago, IL (US); Leo Grady, Yardley, PA (US); Christopher V. Alvino, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 400 days.

This patent is subject to a terminal disclaimer.

(21) Appl. No.: 12/720,753

(22) Filed: Mar. 10, 2010

(65) Prior Publication Data

US 2011/0050703 A1    Mar. 3, 2011

Related U.S. Application Data

(60) Provisional application No. 61/236,635, filed on Aug. 25, 2009.

(51) Int. Cl.
*G06K 9/34* (2006.01)

(52) U.S. Cl. ........................................... 382/173

(58) Field of Classification Search .......... 382/128, 382/130–133, 164–165, 173, 190, 203, 218, 382/224, 276, 283–285, 291; 348/77; 600/410; 378/21, 41; 703/11; 345/419–420, 424, 345/427

See application file for complete search history.

(56) References Cited

U.S. PATENT DOCUMENTS

| 7,194,117 B2 * | 3/2007 | Kaufman et al. | 382/128 |
| 7,697,756 B2 * | 4/2010 | Aharon et al. | 382/173 |
| 7,848,592 B2 * | 12/2010 | Chen et al. | 382/283 |
| 7,990,379 B2 * | 8/2011 | Aharon et al. | 345/424 |
| 7,995,810 B2 * | 8/2011 | Li et al. | 382/128 |
| 8,073,217 B2 * | 12/2011 | Sun et al. | 382/128 |

* cited by examiner

*Primary Examiner* — Jose Couso
(74) *Attorney, Agent, or Firm* — Donald B. Paschburg (57) ABSTRACT

A method for processing image data for segmentation includes receiving image data. One or more seed points are identified within the image data. Intensity and texture features are computer based on the received image data and the seed points. The image data is represented as a graph wherein each pixel of the image data is represented as a node and edges connect nodes representative of proximate pixels of the image data and establishing edge weights for the edges of the graph using a classifier that takes as input, one or more of the computed image features. Graph-based segmentation such as segmentation using the random walker approach may then be performed based on the graph representing the image data.

23 Claims, 8 Drawing Sheets

METHOD AND SYSTEM FOR INTERACTIVE SEGMENTATION USING TEXTURE AND INTENSITY CUES

CROSS-REFERENCE TO RELATED APPLICATION

The present application is based on provisional application Ser. No. 61/236,635, filed Aug. 25, 2009, the entire contents of which are herein incorporated by reference.

BACKGROUND OF THE INVENTION

1. Technical Field

The present disclosure relates to segmentation and, more specifically, to a method and system for interactive segmentation using texture and intensity cues.

2. Discussion of Related Art

Image segmentation relates to the field of processing digital images to accurately distinguish between multiple objects that appear within the image. Image segmentation may be performed for either two-dimensional images or three-dimensional images, still images or moving images, and may be performed for all forms of images, regardless of their modality. While image segmentation may be performed on photographic images, image segmentation is particularly useful in the field of medical imaging. For example, image segmentation may be performed on CT or MR images to distinguish between various organs and other anatomical structures. By accurately distinguishing between anatomical structures within medical images, other medical image processing techniques may be more accurately performed, for example, to detect polyps, lesions, tumors from various portions of the body. Accordingly, image segmentation may play an important role in computer-aided detection of various diseases.

There are many techniques for performing image segmentation. These techniques may involve prompting a user to inspect acquired image data and to provide one or more seed locations that the user knows to be inside of the region to be segmented and/or outside of the region to be segmented. Using this information, image segmentation may be automatically performed by an image processing system to distinguish between image pixels/voxels that are inside the region to be segmented and pixels/voxels that are outside of the region to be segmented. Such segmentation techniques may be known as seed-based segmentation.

According to one simple approach for image segmentation, the user may provide a seed location that is understood to be inside the region to be segmented. A region growing algorithm may then be performed wherein each pixel/voxel adjacent to the selected seed is analyzed to determine whether it represents a change of intensity, with respect to the seed pixel/voxel, in excess of a predetermined threshold. So long as the adjacent pixel/voxel does not represent a sufficiently large change of intensity, that pixel/voxel may be considered to be part of the region to be segmented and that pixel/voxel may then be considered a seed for future iterations of this recursive process. The process may end when all pixels/voxels adjacent to the pixels/voxels that are considered to be part of the region to be segmented represent a change of intensity that is in excess of the predetermined threshold.

However, such techniques are not without problems. For example, where the boundaries of the region to be segmented include one or more points of weakness, for example, due to insufficient contrast between the region and its surrounding tissue, the growing algorithm may escape the boundary and generate an over-inclusive segmentation. Moreover, areas of excessive contrast within the region to be segmented may result in the growing algorithm stopping prematurely and thus generating an under-inclusive segmentation. Image noise may also adversely affect region growing techniques by obfuscating actual boundaries and creating the appearance of boundaries where none exist.

Texture may be a particular concern when dealing with seed-based segmentation because texture may include patterns of high-contrast pixels that may provide many opportunities for premature stopping and undue escaping and the "boundary" between tow textures may simply be a transition from more loosely ordered black dots on a white background to more tightly ordered black dots on a white background. In such a case, there may be no border of high-contrast to contain a segmentation algorithm.

Figure 1A:
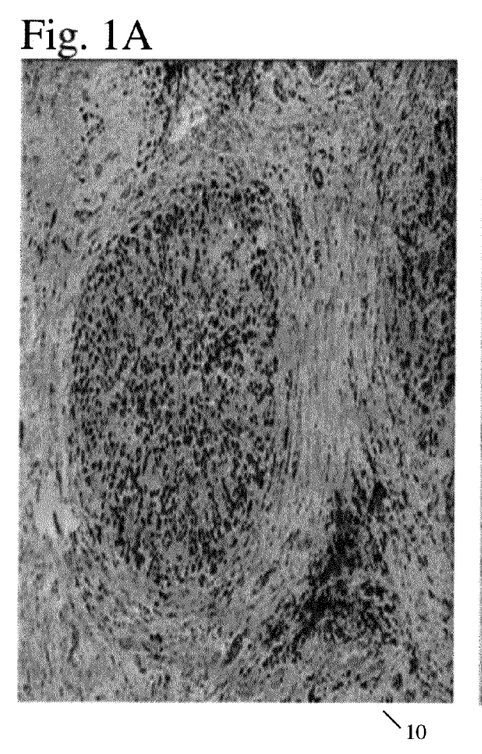
FIG. 1A-1C illustrate an exemplary seed-based segmentation problem according to exemplary embodiments of the present invention.
Figure 1B:
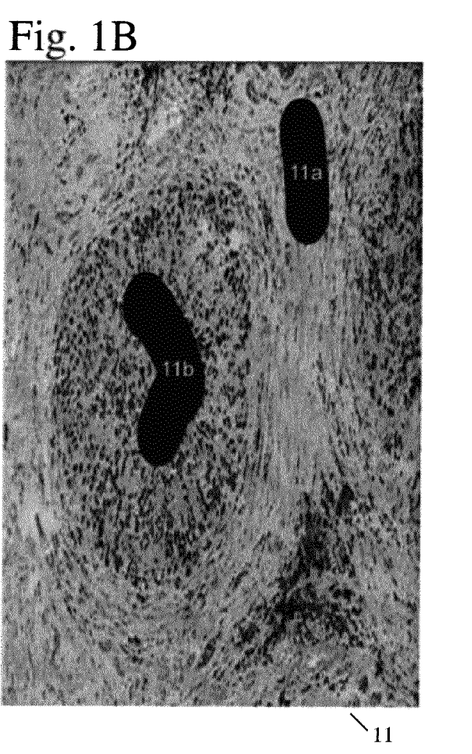
Figure 1C:
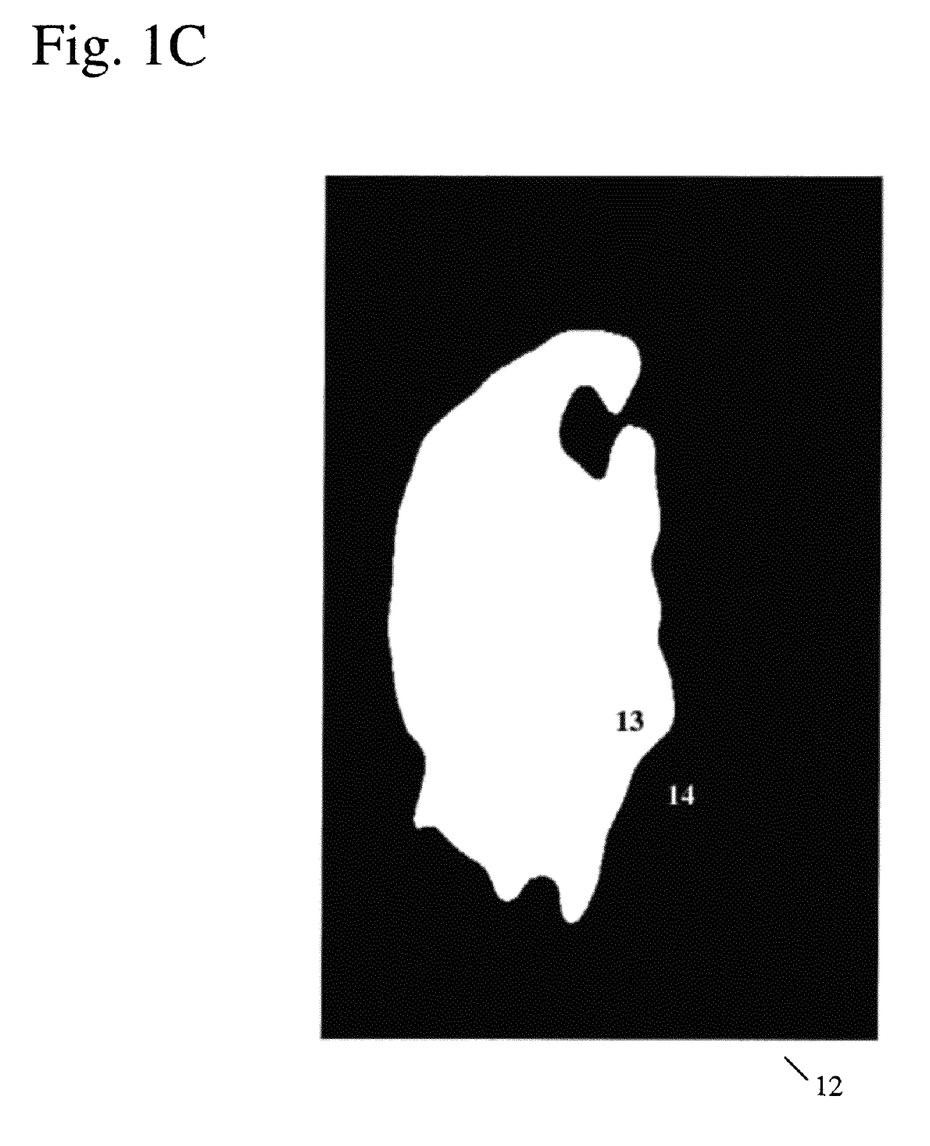

FIGS. 1A-1C illustrate an exemplary seed-based segmentation problem. In FIG. 1A, the image 10 represents medical image data that is highly textured. As seen in FIG. 1B, the image 11 includes two seed locations designated by a user, the first seed location 11a represents a background location and the second seed location 11b represents a foreground location. The ultimate desired result may be seen in FIG. 1C where a segmented image 12 is provided that includes a white foreground image 13 and a black background image. However, as the difference between the foreground and the background is primarily a distinction between two different textures, growing algorithms such as those discussed above may be of little use.

SUMMARY

A method for processing image data for segmentation includes receiving image data, receiving one or more seed points within the image data, computing image features based on the received image data and the seed points, representing the image data as a graph wherein each pixel of the image data is represented as a node and edges connect nodes representative of proximate pixels of the image data, and establishing edge weights for the edges of the graph using a classifier that takes as input, one or more of the computed image features.

The received image data may be MR image data or CT image data acquired from an MR or CT scanner. Alternatively, the received image data may be image data acquired from a camera or microscope.

The image features may be computed using Law masks, dyadic Gabor filter banks, wavelet transforms, quadrature mirror filters, discrete cosine transforms, or eigenfilters. Computed image features may be preprocessed by rectification and smoothing prior to the representing of the image data as a graph. One or more of the computed image features may be selected for use based on separability.

The classifier may be a supervised classifier that is trained using Support Vector Machine (SVM). The classifier may be a discriminative classifier or a classifier that uses membership or fit to a generative model. The classifier may be trained using membership or fit to a Gaussian Model or a Gaussian Mixture Model.

The method may additionally include performing graph-based segmentation on the graph with established edge weights representing the image data using the received seed points. Random walker segmentation may be performed on the graph with established edge weights representing the image data using the received seed points.

The method may additionally include generating easily separable image data based on the graph with established edge weights representing the image data.

A method for processing image data for segmentation includes receiving image data, computing one or more image intensity features and one or more image texture features based on the received image data, representing the image data as a graph where each pixel of the image data is represented as a node and edges connect nodes representative of proximate pixels of the image data, and establishing edge weights for the edges of the graph based on at least one of the image intensity features and at least one of the image texture features.

Establishing edge weights for the edges of the graph based on at least one of the image intensity features and at least one of the image texture features may include training and using a classifier that takes as input, one or more of the computed image intensity features and one or more of the computed image texture features and outputs data that is used as edge weights.

The received image data is MR image data or CT image data acquired from an MR or CT scanner. Alternatively, the received image data is acquired from a camera or microscope.

The image texture features may be computed using Law masks, dyadic Gabor filter banks, wavelet transforms, quadrature mirror filters, discrete cosine transforms, or eigenfilters. Computed image intensity and texture features may be preprocessed by rectification and smoothing prior to the representing of the image data as a graph. One or more of the computed image intensity and texture features may be selected for use based on separability.

The classifier may be a supervised classifier that is trained using Support Vector Machine (SVM). The classifier may be a discriminative classifier or a classifier that uses membership or fit to a generative model. The classifier may be trained using membership or fit to a Gaussian Model or a Gaussian Mixture Model.

Graph-based segmentation may be performed on the graph with established edge weights representing the image data using the received seed points. Alternatively, random walker segmentation may be performed on the graph with established edge weights representing the image data using the received seed points.

Easily separable image data may be generated based on the graph with established edge weights representing the image data.

A method for segmenting an image includes receiving an image, receiving one or more seed points within the image, computing one or more image intensity features and one or more image texture features based on the received image data, representing the image as a graph wherein each pixel of the image is represented as a node and edges connect nodes representative of proximate pixels of the image, establishing edge weights for the edges of the graph based on at least one of the image intensity features and at least one of the image texture features, and segmenting the graph representation of the image including established edge weights using graph-based segmentation and the received seed points.

Establishing edge weights for the edges of the graph based on at least one of the image intensity features and at least one of the image texture features may include training and using a classifier that takes as input, one or more of the computed image intensity features and one or more of the image texture features and outputs data that is used as edge weights.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide an approach to segmenting image data that makes use of texture cues so that distinct image elements may be quickly and accurately differentiated without relying on segmentation algorithms that have a tendency to over-include and under-include when handling image data that is highly textured and/or includes strong noise.

Exemplary embodiments of the present invention seek to provide a system and method for performing image segmentation that is highly accurate and efficient in terms of time and computational resources. While the simple region growing technique for image segmentation is described above, approaches for image segmentation according to exemplary embodiments of the present invention may utilize an alternative approach to determining which pixels/voxels are parts of the region to be segmented and which pixels/voxels are not parts of the region to be segmented. Additionally, there may be multiple different regions to be segmented within a single image and exemplary embodiments of the present invention may be used to quickly and accurately determine whether each pixel/voxel of the image belongs to a particular region to be segmented.

Rather than trying to immediately determine whether a pixel/voxel is part of a particular region to be segmented, exemplary embodiments of the present invention first seek to ascertain a probability that each particular pixel/voxel belongs to each particular region. After this probability has been calculated, the pixel/voxel may then be assigned to the region to be segmented in accordance with the highest probability of belonging to a particular seed.

Thus, where, for example, there are three regions to be segmented A, B, and C (one of which may be a background region), for a particular pixel/voxel, the probability of that pixel/voxel (located at (x,y,z)) being within region A may be calculated as $\rho_A(x,y,z)$, the probability of that pixel/voxel being within region B may be calculated as $\rho_B(x,y,z)$, and the probability of that pixel/voxel being within region C may be calculated as $\rho_C(x,y,z)$. Where $\rho_A(x,y,z) > \rho_B(x,y,z)$ and $\rho_A(x,y,z) > \rho_C(x,y,z)$, the voxel at x,y,z may be assigned to region A. Similarly, the voxel may be assigned to regions B or C where their respective probabilities are greatest.

Accordingly, it is important to be able to accurately determine the probabilities of the various pixels being part of the various regions to be segmented.

Exemplary embodiments of the present invention may build upon the random walker approach to determining these probabilities, for example, as described in U.S. Pat. No. 7,486,820 directed to, "System and Method for Multilabel Random Walker Image Segmentation Using Prior Models," which is herein incorporated by reference.

According to the random walker approach, a user may define a set of seed points for each region. Then, for each given pixel/voxel, the probability for that pixel/voxel being part of a given region is defined in accordance with the chances of a "random walker" beginning at that pixel/voxel from navigating to each respective seed point given the fact that image intensities affect how the otherwise random navigation is to occur. For example, navigation may be determined by defining the terms of movement to make it more likely that the random walker moves to an adjacent pixel/voxel that represents a smaller image gradient than it would be for the random walker to move to an adjacent pixel/voxel that represents a greater image gradient. Accordingly, large gradients represent paths of increased resistance and the random walker is more likely to find the path of least resistance.

However, while the random walker approach may be described in terms of defining respective region probabilities in terms of paths of least resistance from a particular pixel/voxel to each regional seed, the actual movement of the random walker need not be simulated. Mathematical techniques may be applied to the problem of calculating the regional probabilities associated with random walks from given pixels/voxels without necessarily performing a simulation.

The random walker approach may be implemented by constructing a graph in which each pixel/voxel of the image data represents a node and an edge weight between two nodes represents a resistance between the two pixels/voxels that are connected by the edge. In the simplest case, this resistance may be calculated as a change in pixel/voxel intensity. In such a case, the random walker may have a harder time crossing between points of high-intensity transition and a more easy time crossing between points of low intensity transition.

However, for reasons similar to those discussed above, basing edge weights on intensity alone may not be particularly effective in segmenting regions within image data that is highly textured and/or includes strong noise, as both texture and noise may represent instances where high image intensity gradients are not necessarily related to the differentiation of image segments.

Exemplary embodiments of the present invention therefore seek to establish a new representation of resistance between pixels that is based on both texture cues and intensity cues so that regions of distinct texture may be seen as highly resistive in addition to seeing high-intensity transitions as highly resistive. This may be performed, for example, by using one or more trained classifiers that can use the texture and intensity cues and define the resistive quality between pixels accordingly. Segmentation techniques such as random walker may then be performed and the chances of a random walker crossing a transition between distinct textures would be reduced and the probability that two regions within distinct textures be considered part of the same segment would be reduced.

It should be understood, however, that the performance of the random walker segmentation technique is an optional element of the present invention and that other segmentation techniques may be performed in its place. Exemplary embodiments of the present invention may thus focus on defining measures of pixel/voxel similarity that take into account intensity and texture cues. Thereafter, these measures of pixel/voxel similarity may be used to define edge weights for random walker segmentation techniques, for example, by the use of a trained classifier.

Exemplary embodiments of the present invention may also focus on pre-segmentation processes which may convert an original image data into a format where seed based segmentation may be more easily performed. Thereafter, seed based segmentation such as the random walker approach discussed above may be performed.

As discussed above, exemplary embodiments of the present invention may utilize one or more texture cues, in addition to intensity cues, to determine the degree of similarity between various portions of image data. There may be many ways in which image texture may be quantified. For example, texture features may fall into categories such as statistical features, structural features, model-based features, and signal processing features. Although any such features may be utilized to characterize image texture according to the present invention, exemplary embodiments of the present invention may be described herein in terms of signal processing based features for the purposes of simplicity.

Exemplary embodiments of the present invention may also utilize intensity as a way of characterizing similarity between various portions of image data as relying solely on texture features may not be able to adequately characterize boundaries of high contrast and image segments with relatively weak texture.

The random walker approach to segmentation discussed above is an example of a graph-based segmentation technique as each image pixel/voxel is represented as a graph on a node and the measure of difference between nodes is expressed as an edge weight for an edge that combines the nodes. Once the graph has been constructed, either the random walker approach or another form of graph-based segmentation technique may be performed. As discussed above, the measure of similarity/difference between nodes that are used as edge weights may be characterized in accordance with one or more texture features. However, other feature such as color, intensity, and contour may be used in addition to the one or more texture features.

There are several techniques that may be used to extract texture features from image data. These techniques may be thought of as filtering approaches because texture information is filtered from the image data. Examples of suitable filtering approaches include Law masks, dyadic Gabor filter banks, wavelet transforms, quadrature mirror filters, discrete cosine transforms, and eigenfilters. Although any filtering approach, such as those listed above, may be used, exemplary embodiments of the present invention may be described in terms of the discrete cosine transform (DCT) for the purposes of simplicity.

Figure 2:
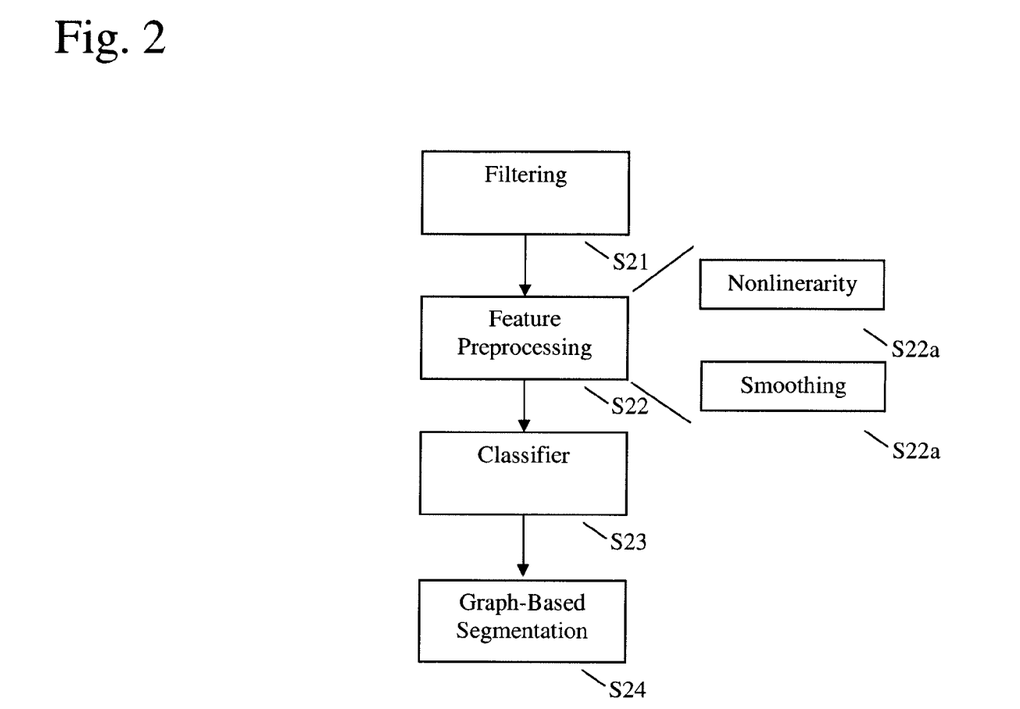
FIG. 2 is a flow chart illustrating an approach for characterizing similarity/difference between pixels/voxels according to an exemplary embodiment of the present invention.

FIG. 2 is a flow chart illustrating an approach for characterizing similarity/difference between pixels/voxels according to an exemplary embodiment of the present invention. As these characterizations may then be used as graph edge weights, for example, through the use of a trained classifier, subsequent to this approach, graph based segmentation techniques may be used to complete image segmentation.

Figure 3:
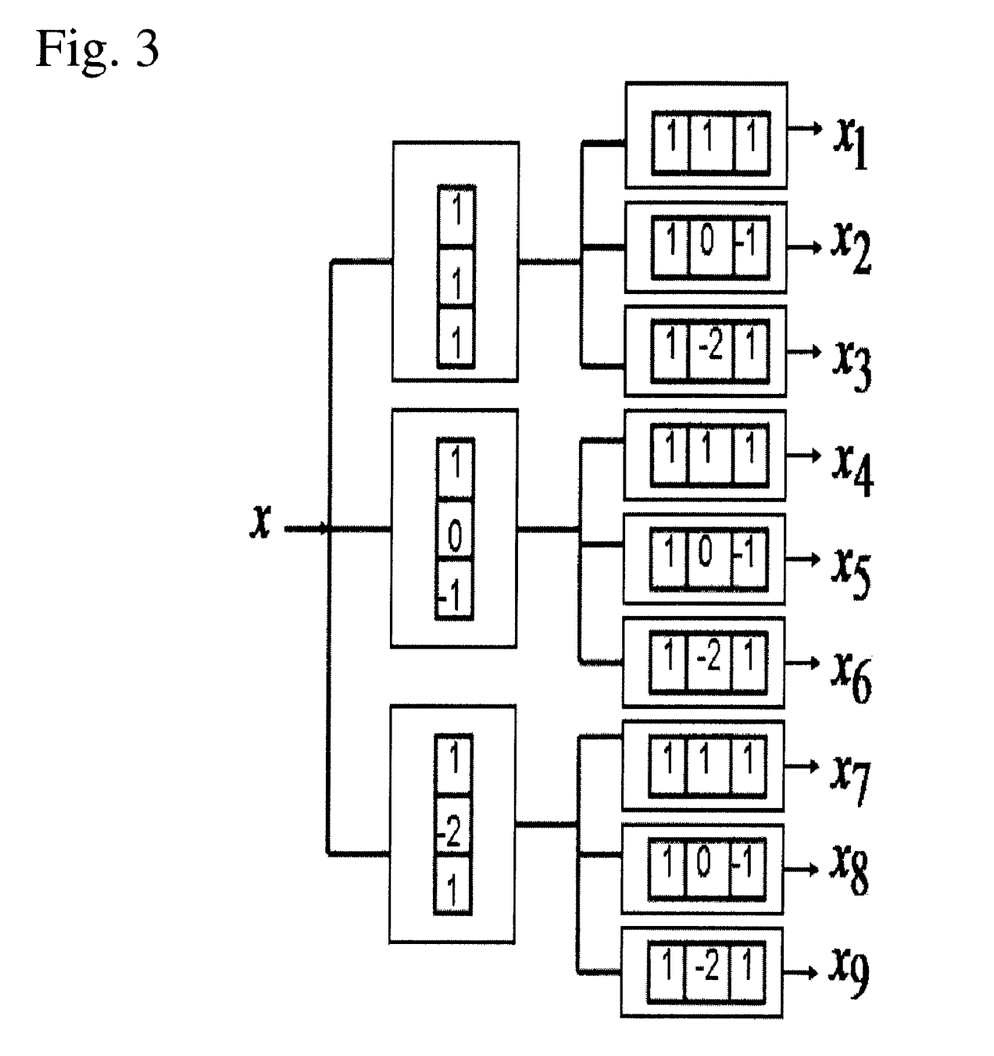
FIG. 3 is an illustration of a filter bank that computed the Discrete Cosine Transform (DCT) in a 3×3 neighborhood according to an exemplary embodiment of the present invention.

First, filtering may be performed on the image data to provide one or more texture cues (Step S21). For example, a DCT may be performed on the image data to extract filter outputs that may be representative of texture. Linear transform techniques such as DCT may be used to characterize local texture properties by the outputs of a bank of small size convolution masks. In this formulation, a bank of local convolution masks may be viewed as a set of basis operators, whose output obtained by matrix multiplication for all local neighborhoods in a sliding window fashion. The discrete cosine transform is a separable transform that may be preferred in texture analysis applications. Separable transforms may be computed successively along the rows and columns of the image data. FIG. 3 is a filter bank block diagram showing computation of DCT in a 3×3 neighborhood according to an exemplary embodiment of the present invention. As is demonstrated herein, the discrete cosine transform is linearly separable and computationally efficient. However, it should be understood that any efficient approach for extracting features may be used and DCT is offered as an example of a suitable approach. Here, a N×1 DCT basis vector $u_m$ may be expressed as:

$$u_m(k) = \begin{cases} 1/\sqrt{N} & m = 1; \\ \sqrt{\frac{2}{N}} \cos\left(\frac{(2k-1)(m-1)\pi}{2N}\right) & m = 2, \ldots, N \end{cases} \quad (1)$$

These 1D-DCT vectors may be used to generate two-dimensional transform filters that may be applied to the image data. Application of the image filters may be performed, for example, by multiplying the column basis vectors with the row basis vectors of same length to produce a set of 2D filters of $N^2$ entities. A set of 3×3 DCT masks may be generated from three 1D-DCT vectors $u_m$. The basis vectors $u_m$ defined in the above equation for N=3 may be $u_1=(1, 1, 1)'$, $u_2=(1, 0, -1)'$ and $u_2=(1, -2, 1)'$ respectively.

Next, feature preprocessing may be applied to the filter outputs (Step S22). The feature preprocessing may be used to enhance local image properties for the purposes of facilitating classification. As certain preprocessing techniques may not adequately preserve image edge delineation, the step of performing feature preprocessing may include a nonlinearity step (Step S22a) and a rectification and smoothing step (Step S22b). Rectification and smoothing may be performed using approaches known in the art. For example, rectification and smoothing may be performed using a Gaussian low pass filter with unit impulse response in each direction. The size of the smoothing filter used may be selected based on need but may be, for example, defined as $\sigma_s=8.5$. The Gaussian low pass filter used may be expressed as:

$$h_G(n) = \frac{1}{\sqrt{2\pi}\sigma_s} e^{\frac{1}{2}\frac{n^2}{\sigma_s^2}} \quad (2)$$

The nonlinearity step (Step S22a) may include the application of a magnitude $|\cdot|$, a squaring $(\cdot)^2$, and a rectified sigmoid $|\tan h(\alpha)|$. The output of performing this local energy function estimation may be one or more feature vectors.

After the feature preprocessing step has been performed (Step S22), the feature vectors may be classified (Step S23). In this step, the feature vectors may be classified as a set of texture features using, for example, a supervised classifier such as Support Vector Machine (SVM). SVM is a universal learning algorithm based on the statistical learning theory. Learning is the process of selecting the best mapping function $f(x,\omega)$ from a set of mapping models parameterized by a set of parameter $\omega \in \Omega$. Given a finite sample data set $(x_i,y_i)$ for $i=1, 2, \ldots, N$, where $x_i \in R^d$ is a d dimensional input (feature) vector and $y_i \in \{-1,1\}$ is a class label, the objective being to estimate a mapping function $f: x \rightarrow y$ in order to classify future test samples.

In addition to, or in place of using the SVM classifier in a discriminative fashion, a Gaussian Model may be used to classify the feature vectors in a generative fashion. As used herein, a classifier that uses membership or fit to a generative model such as a Gaussian Model or a Gaussian Mixture Model may be referred to herein as a generative classifier. Here, initially, training data of one class is used to fit a Gaussian with a mean $\mu_1$ and covariance $\Sigma_1$. A multivariable Gaussian model may be evaluated using the test data (X) as follows:

$$y(i,:) = \exp(-0.5 * \text{dist})/\sqrt{((2\pi)^{dim} * \det(\Sigma_i))} \quad (3)$$

where:

$$\text{dist}(i) = (X(:,i)-\mu)'*\text{inv}(\Sigma_i)*(X(:,i)-\mu) \quad (4)$$

and $\mu$ and $\Sigma$ correspond to model mean and covariance estimated during the training stage. Classification could alternatively be performed using a Gaussian mixture model (GMM) in place of the Gaussian model.

Regardless of the manner of classification used, exemplary embodiments of the present invention may utilize a trained classifier as a way of producing graph edge weights for subsequent segmentation. The classifier used may be trained in real-time, for example, as image data is being processed for segmentation. As the classifier may be used in this manner, there might not be an opportunity for off-line training. Accordingly, as described above, the classifier used may be computationally efficient and easily separable.

The classifier used may act as a function that establishes edge weights based on the input features. Exemplary embodiments of the present invention may utilize either a discriminative classifier that distinguishes between image pixels that are foreground-like and image pixels that are background-like. Alternatively, a generative classifier may be used that determines the extent to which each pixel of the image data is foreground-like without regard to a background.

Exemplary embodiments of the present invention may utilize a segmentation system using a few features characterizing the class membership of the patterns. Feature selection may provide an indication about the discriminative potential of the features. Exemplary embodiments of the present invention are described herein as utilizing a set of ten features that may be extracted by the classification step. One of these features may be an intensity feature and the remaining nine may be texture features, for example, as provided by the DCT. The invention, however, should not be considered as limited to this particular set of features and any number of intensity features may be used along with any number of texture features. Indeed, exemplary embodiments of the present invention may be used with as little as one feature that may be either an intensity feature or a texture feature.

The use of a relatively few features may be sufficient to adequately characterize the image and accordingly, a subset of most significant features may be selected from among those provided. The intensity feature may be the image itself.

Accordingly, feature selection may be performed to identify those of the ten features that are most useful for the particular. In selecting the best features from among the 10 available features, each of the 9 DCT and 1 intensity feature may be normalized to the range [0,1].

Classes may be defined, in the simplest example, as foreground and background. However, where there are multiple image segments, there may be multiple foregrounds. As foreground and background seed pixels are selected by a user, the seed pixels themselves may be considered to have known classes. Segmentation may then become a matter of classifying the remaining pixels as either foreground or background. Each feature may be able to distinguish between classes for each of the remaining pixels to a different degree. Those features that are best able to distinguish between classes are considered to be highly separable while those features that are least able to distinguish between classes are considered to be poorly separable. Thus, the separability of each feature represents its ability to distinguish between pixels belonging to the various classes.

After normalization, the separability of each feature may be measured individually using the following measures:

The first measure may be "classification error." Classification error may be an effective criterion of feature set effectiveness. However, this criterion function is often not used due to its computational complexity. As an alternative, another measure of class separability may be used. For example, exemplary embodiments of the present invention may use interclass distance measures such as the Fisher Discrimination ratio, which may be an efficient measure from a computational point of view.

A ranking search may be performed to order features based on their individual merit as measured by a criterion function. The criterion function may be a probabilistic distance measure between probability density functions (pdf's) of two classes. Such a search may be referred to herein as a ranking search.

Probabilistic measures may be used for evaluating the discriminatory information conveyed by a set of features such as Chernoff, Bhattacharya and Kolmogorov, etc. While the present invention may utilize any probabilistic measure, exemplary embodiments of the present invention are described herein as using the Chernoff distance for illustrative purposes. The Chernoff distance may be written as follows:

$$J_C = -\ln \int p^s(\underline{\xi}|w_1) p^{1-s}(\underline{\xi}|w_i) d\underline{\xi} \quad (5)$$

where s is a parameter from the interval [0,1]. The special case of the Chernoff distance measure when s=0.5 may be referred to as the Bhattacharya distance and s may be set to this value. However, according to exemplary embodiments of the present invention, any value for s may be used. For example, s may be set to 0.2.

The probabilistic distance measure may be analytically simplified in the case when the class conditional pdf's $p(\underline{\xi}|w_i)$ belong to a family of parametric pdf's. In particular, when the classes are normally distributed, for example, $p(\underline{\xi}|w_i)$, i=1, 2, ... may be given as:

$$p(\underline{\xi} | w_i) = [(2\pi)^d |\Sigma_i|]^{-1/2} \exp\left\{\frac{1}{2}(\underline{\xi} - \underline{\mu}_i)^t \Sigma_i^{-1} (\underline{\xi} - \underline{\mu}_i)\right\} \quad (6)$$

where $\mu_i$ and $\Sigma_i$ represent the mean vector and covariance matrix of the distribution of $\xi \epsilon w_i$. $J_c$ then may becomes:

$$J_C = \frac{1}{2} s(1-s)(\mu_1 - \mu_2)^t [(1-s)\Sigma_1 + s\Sigma_2]^{-1}(\mu_1 - \mu_2) + \quad (7)$$
$$\frac{1}{2} \ln \frac{|(1-s)\Sigma_1 + s\Sigma_2|}{|\Sigma_1|^{1-s}|\Sigma_2|^s}$$

Feature selection may also include an assessment of overlap between features. For each feature, maximum and minimum values of each class may be determined. The number of overlapping elements may then be calculated and normalized by the total number of elements spanned by both classes. For example, the maximum and minimum values of each feature $f_i$ in class $c_j$ may be expressed as $\max(f_i, c_j)$ and $\min(f_i, c_j)$, respectively. In such a case, the overlap measure may be defined as:

$$F = \frac{\min(\max(f_i, c_1), \max(f_i, c_2)) - \max(\min(f_i, c_1), \min(f_i, c_2))}{\max(\max(f_i, c_1), \max(f_i, c_2)) - \min(\min(f_i, c_1), \min(f_i, c_2))} \quad (8)$$

After features have been selected, for example, as described above, the selected features may then be used to assist in segmentation as will be described below.

However, prior to making use of the selected features, feature refinement may be performed, for example, to increase contrast between foreground and background and to accordingly facilitate segmentation. While isotropic smoothing may be used, isotropic smoothing may have a tendency to blur lines of delineation. Accordingly, exemplary embodiments of the present invention may utilize intra-region smoothing to avoid blurring lines of delineation between image regions. For example, anisotropic diffusion may be used as a smoothing technique that is more respectful of edges and encourages smoothing within a region over smoothing across boundaries. However, it should also be noted that the use of anisotropic smoothing instead of Gaussian smoothing while estimating the DCT coefficients may negatively effect segmentation.

Figure 4:
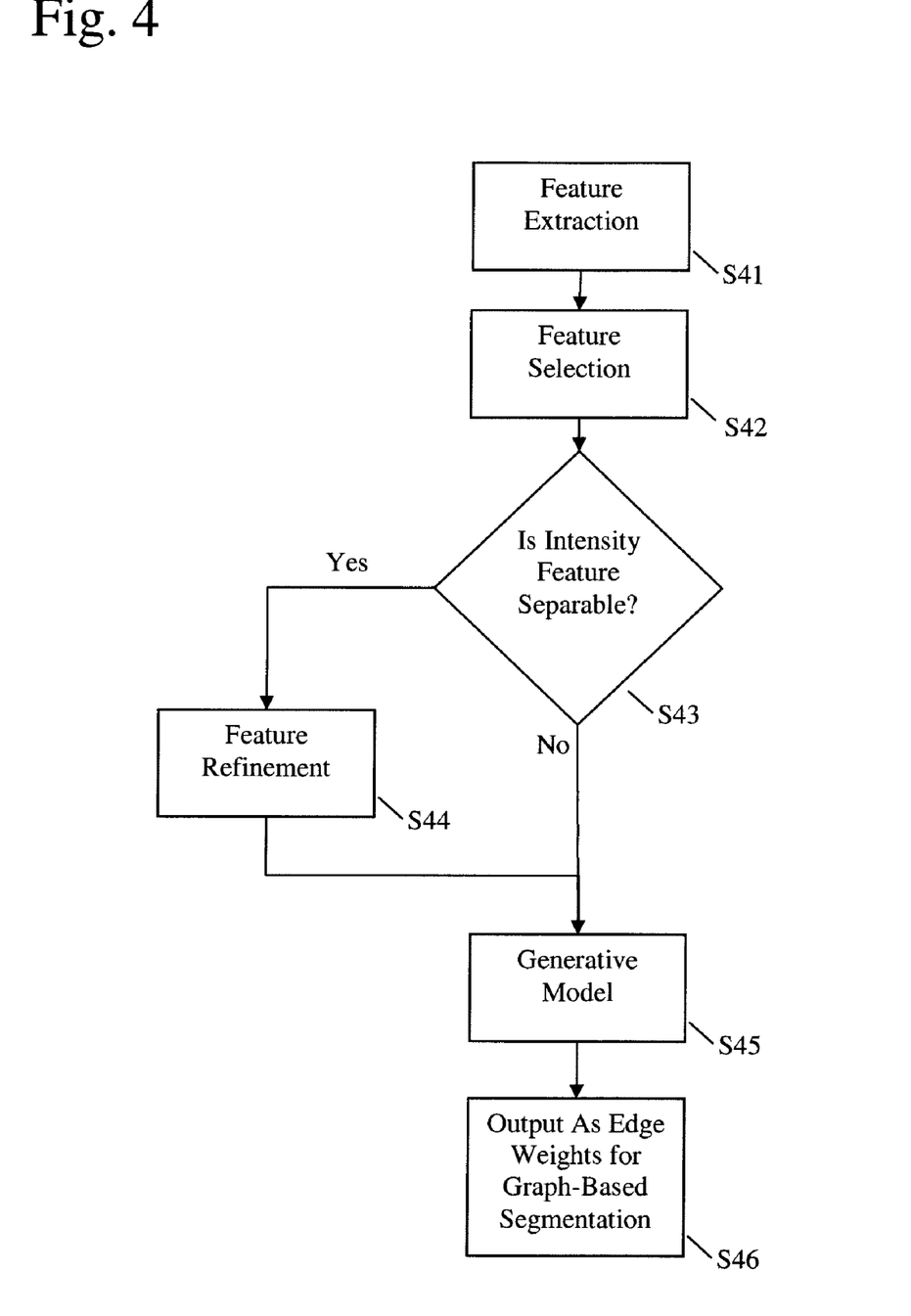
FIG. 4 is a flow chart illustrating an approach for aiding image segmentation using generative classifiers according to an exemplary embodiment of the present invention.
Figure 5:
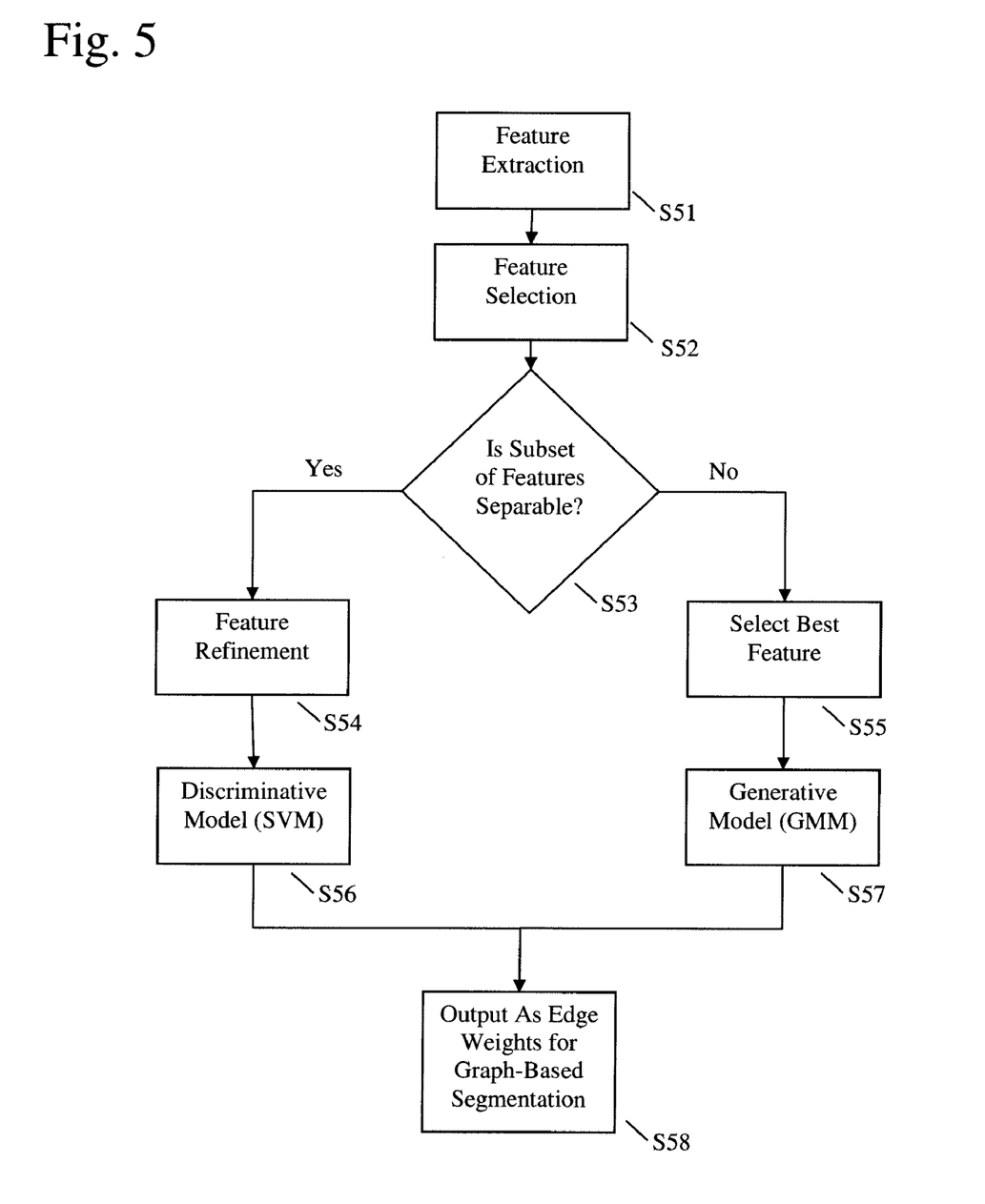
FIG. 5 is a flow chart illustrating an approach for aiding image segmentation using a combination of generative classifiers and discriminative classifiers.

Exemplary embodiments of the present invention may utilize various approaches for aiding image segmentation using one or more of the techniques discussed above. For example, as described above either a generative classifier or a discriminative classifier may be used to define edge weights from the image and/or texture features. FIG. 4 is a flow chart illustrating an approach for aiding image segmentation using generative classifiers. FIG. 5 is a flow chart illustrating an approach for aiding image segmentation using a combination of generative classifiers and discriminative classifiers.

Referring to FIG. 4, although not shown, image data may be received. As indicated above, image data may be two-dimensional or three-dimensional medical image data, for example, MRI or CT studies. However, exemplary embodiments of the present invention are not limited thereto, and alternatively, the received image data may be optical image data such as image data acquired from a digital camera, video camera, microscope, or the like. Acquired image data may also be image data acquired from any other source such as a scanning electron microscope (SEM) or the like. Feature extraction may be performed on the received image data (Step S41). Feature extraction may be performed, for example, as described in detail above with respect to FIG. 2. Feature extraction may accordingly include filtering, non-linearity, smoothing, and classification. The result of feature extraction may be to compute one or more texture feature vectors. For example, nine image features may be computed by the performance of DCT, as described above. An intensity feature may also be computed, for example, directly from the image data. In the performance of smoothing, anisotropic diffusion may be used on all features, including the intensity feature.

Feature selection may then be performed (Step S42). Feature selection may be performed, for example, as described in detail above, with a subset of the nine texture features being selected over the remaining features.

Next, it may be determined whether the intensity feature is the most separable feature (Step S43). Separability may be a measure of how well a given feature can distinguish between regions of the image data. In making this determination, separability scores may be computed for all features including the intensity and texture features, for example, using the Chernoff distance between two pdf's of two classes. The computed separability scores may then be compared and if the intensity feature has the highest score (Yes, Step S43), then feature refinement may be performed on all of the features (Step S44). Feature refinement may include, for example, computing the chi-square distance between the histograms of the normalized test feature and original normalized images. Feature refinement may then result in choosing only the selected features that also have less than a 5% chi-squared distance error. Feature refinement may serve to increase the sharpness of the features and to avoid including dilated DCT features in the final feature set.

After feature refinement (Step S44) a generative model may be constructed (Step S45). If the intensity feature is not the most separable feature and/or the intensity feature is simply not separable (No, Step S43), then the generative model may be constructed (Step S45) without feature refinement. Model generation may be dependent upon the outcome of Step S43. Where the intensity feature is not separable, the feature that has the highest separability score may be used to construct a generative model, for example, using training data of a single class. Where the intensity feature is separable, the refined features may be used to construct the generative model such as a Gaussian model or a Gaussian Mixture Model (GMM) using training data of a single class.

The output of the generative model may then be used to set edge weights for graph-based segmentation, for example, for subsequent segmentation using the random walker approach (Step S46).

Referring to FIG. 5, although not shown, image data may be received. Feature extraction may be performed (Step S51). Feature extraction may be similar to the manner discussed above. Anisotropic diffusion may be perfumed on all features as part of the feature extraction step. Next, feature selection may be performed, for example, as described above (Step S52). After feature selection has been performed, it is then determined whether a subset of the selected features are separable (Step S53). This may be performed by computing separability scores for each of the selected features, for example, by calculating the Chernoff distance between pdf's of two classes. User selected seed points may be considered in this step and it may be checked if training points are separable for two classes. If it is determined that a subset of features are separable (Yes, Step S53), then feature refinement may be performed (Step S56). However, if it is determined that there is no subset of features that are separable, (No, Step S53) a best feature is selected (Step S55).

Feature refinement may be performed as discussed above and where the intensity feature has the highest separability, for each of the features in the separable subset, the chi-squared distance between histograms of the normalized test feature and original normalized image may be calculated. The features that have less than a 5% chi-squared distance error may then be selected. However, if the intensity is not separable, all of the selected features may be kept.

Selection of the best feature (Step S55) may be performed if there is no subset of featured that are separable (No, Step S53). The best feature may be the feature with the highest separability score, even where the corresponding feature is not considered to be separable.

Where feature refinement has been performed (Step S54), the refined features may then be used to construct a discriminative model (SVM) (Step S56). However, where the best feature has been selected (Step S55), the best feature may then be used to construct a generative model such as a Gaussian model or a Gaussian Mixture Model (GMM).

The output of the model used may then be used to set edge weights for graph-based segmentation, for example, for subsequent segmentation using the random walker approach (Step S58).

Figure 6:
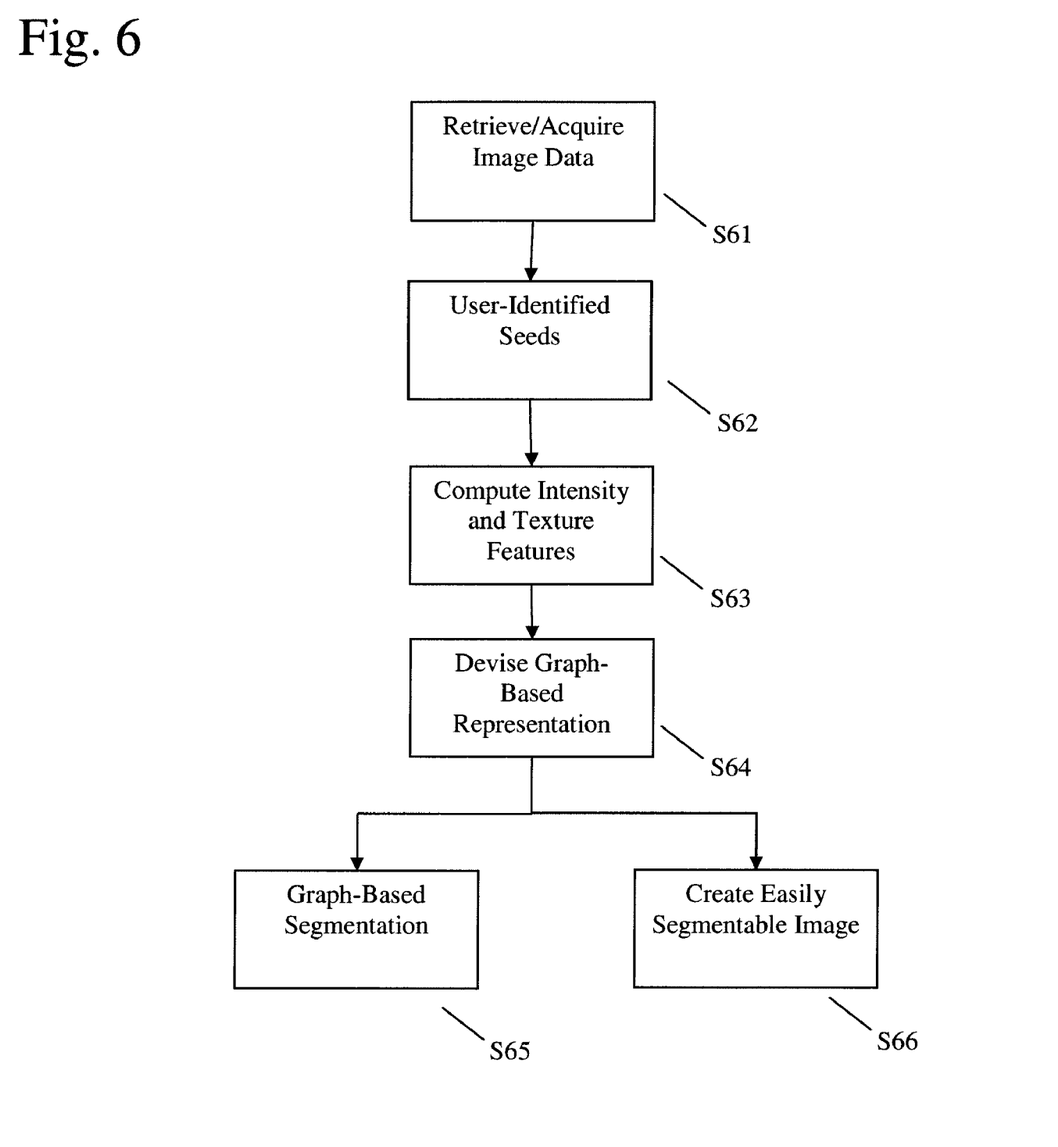
FIG. 6 is a flow chart illustrating a method for performing graph-based segmentation of image data in accordance with an exemplary embodiment of the present invention.

As discussed above, exemplary embodiments of the present invention may relate to performing graph-based segmentation on image data using intensity and texture cues. FIG. 6 is a flow chart illustrating a method for performing graph-based segmentation of image data in accordance with an exemplary embodiment of the present invention. First, image data may be acquired (Step S61). As described above, image data may be medical image data acquired using a two-dimensional or three-dimensional imaging modality. Alternatively, exemplary embodiments of the present invention may retrieve previously-acquired image data from a storage medium or database.

After the image data has been acquired or retrieved, one or more seed points may be selected by a user from the image data (Step S62). This may be performed, for example, by displaying the image data for the user and prompting the user to identify a foreground region and a background region. Where multiple region segmentation is desired, the user may identify multiple foreground regions.

Features may then be computed from the image data (Step S63). Computation of features may utilize the user-identified seeds as examples of members of a known class. The features may include at least one intensity feature and at least one texture feature. Alternatively, the features may include at least one feature that is either an intensity feature or a texture feature. Where multiple features of each type are computed, preferential features may be selected from among the available features, for example, as described in detail above. However, regardless of whether selection of features occurs, there may ultimately be at least one feature used. The intensity feature may express pixel intensity, and may accordingly be similar to or identical to the original image data. The texture features may characterize a texture for which the given pixel is part of. This may be computed, for example, by analyzing a neighborhood of the given pixel and identifying the neighborhood of pixels as a particular texture.

A graph-based representation of the image data may then be devised (Step S64). As described above, in the graph-based representation, each pixel (or grouping of pixels) of the image data may be represented in the graph as a node and an edge may connect proximate nodes. The weight of each edge may be based on both the intensity feature(s) and the texture feature(s) that were computed and perhaps selected. The edge weight may accordingly reflect a degree of similarity between proximate pixels in terms of both intensity and texture. For example, a relatively heavy weight may represent a more significant differentiation between proximate pixels than a relatively light weight that may represent similar pixels. As edge weight is based on both intensity features and texture features, edge weights connecting nodes may be relatively heavy where the corresponding pixels either have a distinct texture or are of significantly different intensities. Edge weights may be especially heavy where the corresponding pixels have both distinct textures and significantly different intensity values. Edge weights may be relatively light where corresponding pixels are of substantially the same texture and substantially the same intensity.

Edge weights need not be determined directly from the intensity and texture features. As described above, the output of the classifier may be used to predict the edge weights. However, exemplary embodiments are not limited to the use of the classifier and thus, in a more general sense, it is the texture and intensity features that contribute to the edge weights. A classifier may be used, however, to implement this contribution.

Exemplary embodiments of the present invention may end with the creation of the graph-based representation of the image data however exemplary embodiments of the present invention may alternatively perform subsequent steps. For example, graph-based segmentation may then be performed using the devised graph and the selected seed points (Step S65). Graph-based segmentation may be based on the random walker approach or another graph-based segmentation approach. According to the random walker approach, the probability of a fictitious "random walker" starting at one seed point and winding up at another seed point by movements in random directions is assessed with the precondition that it is more likely for the random walker to travel along lighter edge weights than traveling along heaver edge weights. It is accordingly, less likely, but not impossible, that the random walker would move between pixels with distinct intensities and/or distinct textures than that the random walker would move between pixels with similar intensities and similar textures. As there need not be an actual random walker simulation, the general case probability may be calculated and a probabilistic determination as to the most likely walking paths may be established.

However, as discussed above, edge weights may be set according to a classifier that makes use of the intensity and texture features rather than having the intensity and texture features directly defining the edge weights.

Then, random walks may be calculated for pixels proximate to the first seed point so that their probability of reaching the second seed point can be calculated. Segmentation is then performed by determining where pixels transition between a high likelihood of reaching a seed point and a low likelihood of reaching a seed point under the assumption that a random walker is highly likely to move between pixels of a common image segment are less likely to move between pixels of distinct image segments.

However, actual performance of random walker segmentation is merely an optional step and exemplary embodiments of the present invention may terminate in the construction of the graph representation of the image data with both nodes and edges. Alternatively, a new image representation may be created based on the graph representation (Step S66) such that the new image representation is easier to segment by traditional means then the original image data. For example, transitions of high edge weights, resulting from intensity and texture cues, are translated into increased intensity contrast so that conventional approaches to image segmentation, such as region growing, may be more effectively used.

Exemplary embodiments of the present invention may be performed on a computer system including a processor and a program storage device that is non-transitory, tangible and readable by the computer system. The storage device embodying a program of instructions executable by the processor to perform methods such as those described above.

Figure 7:
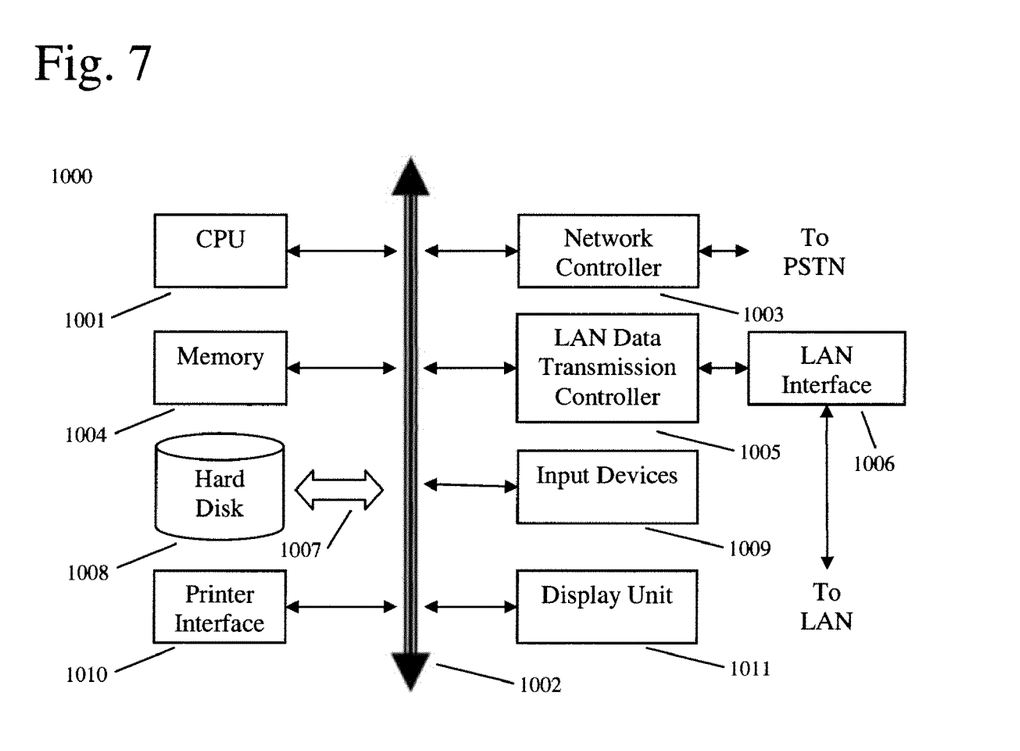
FIG. 7 shows an example of a computer system capable of implementing the method and apparatus according to embodiments of the present disclosure.

FIG. 7 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for representing image data as a graph, comprising:
    receiving image data;
    receiving one or more seed points within the image data;
    computing image features based on the received image data and the seed points;
    representing the image data as a graph wherein each pixel of the image data is represented as a node and edges connect nodes representative of proximate pixels of the image data; and
    establishing edge weights for the edges of the graph using a classifier that takes as input, one or more of the computed image features, wherein each of the above steps is performed by a computer system.

2. The method of claim 1, wherein the image features are computed using Law masks, dyadic Gabor filter banks, wavelet transforms, quadrature mirror filters, discrete cosine transforms, or eigenfilters.

3. The method of claim 1, wherein computed image features are preprocessed by rectification and smoothing prior to the representing of the image data as a graph.

4. The method of claim 1, wherein one or more of the computed image features are selected for use based on separability.

5. The method of claim 1, wherein the classifier is a supervised classifier that is trained using Support Vector Machine (SVM).

6. The method of claim 1, wherein the classifier is a discriminative classifier or a classifier that uses membership or fit to a generative model.

7. The method of claim 1, wherein the classifier is trained using membership or fit to a Gaussian Model or a Gaussian Mixture Model.

8. The method of claim 1, additionally comprising performing graph-based segmentation on the graph with established edge weights representing the image data using the received seed points.

9. The method of claim 1, additionally comprising performing random walker segmentation on the graph with established edge weights representing the image data using the received seed points.

10. The method of claim 1, additionally comprising generating easily separable image data based on the graph with established edge weights representing the image data.

11. A method for representing image data as a graph, comprising:
receiving image data
computing one or more image intensity features and one or more image texture features based on the received image data;
representing the image data as a graph wherein each pixel of the image data is represented as a node and edges connect nodes representative of proximate pixels of the image data; and
establishing edge weights for the edges of the graph based on at least one of the image intensity features and at least one of the image texture features,
wherein each of the above steps is performed by a computer system.

12. The method of claim 11, wherein establishing edge weights for the edges of the graph based on at least one of the image intensity features and at least one of the image texture features includes training and using a classifier that takes as input, one or more of the computed image intensity features and one or more of the computed image texture features and outputs data that is used as edge weights.

13. The method of claim 11, wherein the image texture features are computed using Law masks, dyadic Gabor filter banks, wavelet transforms, quadrature mirror filters, discrete cosine transforms, or eigenfilters.

14. The method of claim 11, wherein computed image intensity and texture features are preprocessed by rectification and smoothing prior to the representing of the image data as a graph.

15. The method of claim 11, wherein one or more of the computed image intensity and texture features are selected for use based on separability.

16. The method of claim 12, wherein the classifier is a supervised classifier that is trained using Support Vector Machine (SVM).

17. The method of claim 12, wherein the classifier is a discriminative classifier or a classifier that uses membership or fit to a generative model.

18. The method of claim 12, wherein the classifier is trained using membership or fit to a Gaussian Model or a Gaussian Mixture Model.

19. The method of claim 11, additionally comprising performing graph-based segmentation on the graph with established edge weights representing the image data using the received seed points.

20. The method of claim 11, additionally comprising performing random walker segmentation on the graph with established edge weights representing the image data using the received seed points.

21. The method of claim 11, additionally comprising generating easily separable image data based on the graph with established edge weights representing the image data.

22. A method for segmenting an image, comprising:
receiving an image;
receiving one or more seed points within the image;
computing one or more image intensity features and one or more image texture features based on the received image data;
representing the image as a graph wherein each pixel of the image is represented as a node and edges connect nodes representative of proximate pixels of the image;
establishing edge weights for the edges of the graph based on at least one of the image intensity features and at least one of the image texture features; and
segmenting the graph representation of the image including established edge weights using graph-based segmentation and the received seed points, wherein each of the above steps is performed by a computer system.

23. The method of claim 22, wherein establishing edge weights for the edges of the graph based on at least one of the image intensity features and at least one of the image texture features includes training and using a classifier that takes as input, one or more of the computed image intensity features and one or more of the image texture features and outputs data that is used as edge weights.

* * * * *